(12) United States Patent
Duccini et al.

(10) Patent No.: US 11,074,648 B1
(45) Date of Patent: Jul. 27, 2021

(54) BLOCKCHAIN BASED LOAN SECURITIZATION

(71) Applicant: Wells Fargo Bank, N.A., San Francisco, CA (US)

(72) Inventors: David Duccini, St. Paul, MN (US); Phillip H. Griffin, Raleigh, NC (US); David Newman, Walnut Creek, CA (US); Nishant Usapkar, San Ramon, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 401 days.

(21) Appl. No.: 15/948,346

(22) Filed: Apr. 9, 2018

Related U.S. Application Data

(60) Provisional application No. 62/492,674, filed on May 1, 2017.

(51) Int. Cl.
*G06Q 40/02* (2012.01)
*H04L 29/06* (2006.01)
*H04L 9/06* (2006.01)
*H04L 29/08* (2006.01)
*H04L 9/32* (2006.01)

(52) U.S. Cl.
CPC ........ *G06Q 40/025* (2013.01); *H04L 9/0637* (2013.01); *H04L 9/0643* (2013.01); *H04L 9/3247* (2013.01); *H04L 63/0807* (2013.01); *H04L 63/0861* (2013.01); *H04L 63/102* (2013.01); *H04L 67/30* (2013.01); *H04L 67/104* (2013.01)

(58) Field of Classification Search
CPC .... G06F 40/166; G06F 16/2379; G06Q 40/08
USPC .......................................................... 705/38
See application file for complete search history.

(56) References Cited

U.S. PATENT DOCUMENTS

| | | |
|---|---|---|
| 2016/0203496 A1 | 7/2016 | Guerrero et al. |
| 2016/0292680 A1 | 10/2016 | Wilson et al. |
| 2016/0300234 A1 | 10/2016 | Moss-Pultz et al. |
| 2016/0330027 A1 | 11/2016 | Ebrahimi |
| 2017/0132625 A1* | 5/2017 | Kennedy ............ G06F 16/2379 |
| 2018/0047111 A1* | 2/2018 | Vieira .................... G06Q 40/08 |
| 2018/0174255 A1* | 6/2018 | Hunn .................... G06Q 10/10 |

FOREIGN PATENT DOCUMENTS

WO  WO2016/204461  12/2016

\* cited by examiner

*Primary Examiner* — Clifford B Madamba
(74) *Attorney, Agent, or Firm* — Foley & Lardner LLP

(57) ABSTRACT

Examples described herein relate to systems, apparatuses, and methods for automating loan securitization by a loan marketplace server, including defining a security blockchain supporting a financial security smart contract and posting, on the security blockchain, loan links. Each of the loan links identifies a loan structured as a loan smart contract supported by a loan blockchain. The loan blockchain stores a financial profile link that identifies a dynamic financial profile for a borrower of the loan.

16 Claims, 4 Drawing Sheets

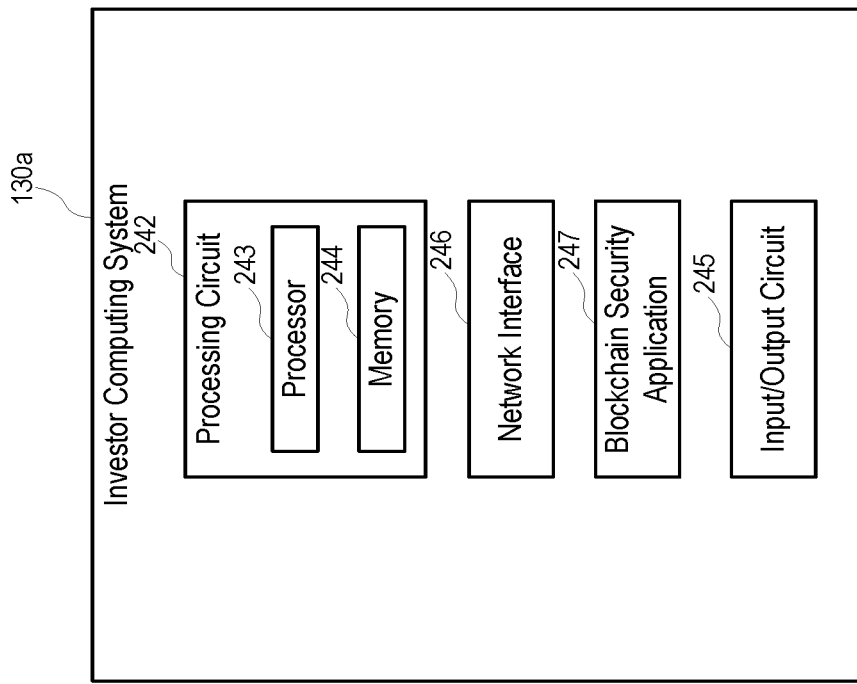
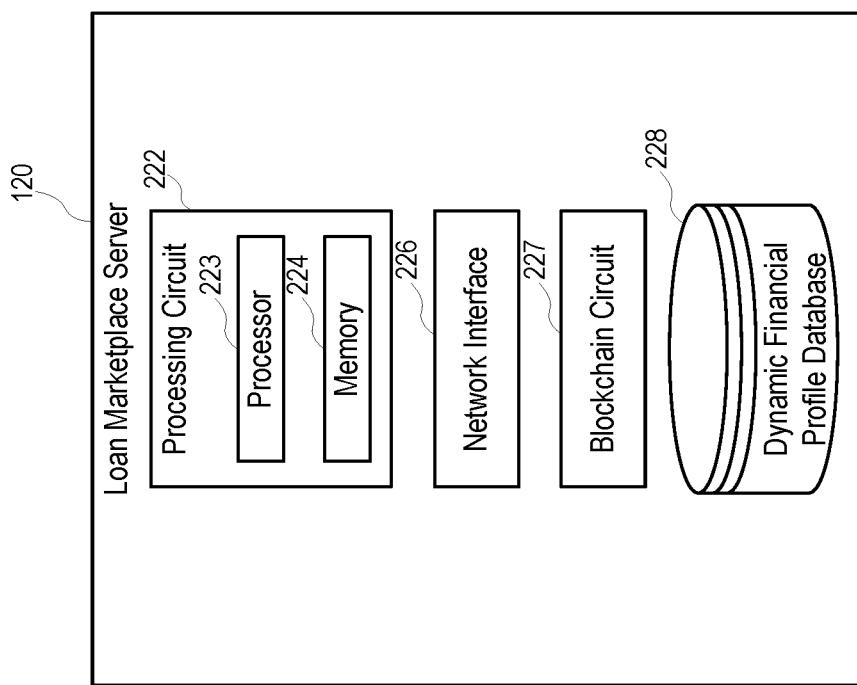
FIG. 2B
FIG. 2A

BLOCKCHAIN BASED LOAN SECURITIZATION

CROSS-REFERENCE

The present application claims the benefit of priority to U.S. Patent Application No. 62/492,674, filed May 1, 2017, which is incorporated herein by reference in its entirety. The present disclosure also relates to U.S. Patent Application No. 62/491,202, filed on Apr. 27, 2017, which is also incorporated herein by reference in its entirety.

BACKGROUND

The housing market crash in 2012 was spurred in part by the inability of the traditional loan origination and securitization processes to identify the risks associated with individual borrowers during the lifecycles of the loans, particularly during the securitization process. In a traditional securitization process, loans and mortgages are pooled into Mortgage-Backed Securities (MBSs) or Collateralized Debt Obligations (CDOs), and those MBSs or CDOs are de-aggregated and re-bundled into advanced securities to be exchanged. The packaging and repackaging of the loans and mortgages resulted in lack of traceability and transparency with respect to the health of those loans and mortgages because there was no solution to manage the vast amount of data associated with the underlying loans and mortgages. Due to the lack of information, the financial sector lacked the ability to identify and manage the risks associated with those loans and mortgages.

SUMMARY

In some arrangements, a method for automating loan securitization by a loan marketplace server includes defining a security blockchain supporting a financial security smart contract, and posting, on the security blockchain, loan links. Each of the loan links identifies a loan structured as a loan smart contract supported by a loan blockchain. The loan blockchain stores a financial profile link that identifies a dynamic financial profile for a borrower of the loan.

In some arrangements, a loan marketplace server includes a network interface, a dynamic financial profile database storing a dynamic financial profile of a borrower, and a processing circuit. The processing circuit is configured to define a security blockchain supporting a financial security smart contract and post, on the security blockchain, loan links. Each of the loan links identifies a loan structured as a loan smart contract supported by a loan blockchain. The loan blockchain stores a financial profile link that identifies the dynamic financial profile.

In some arrangements, a method for automating loan securitization by a loan marketplace server providing an Application Programming Interface (API) to an investor computing system, including facilitating, through the API, the investor computing system to define a security blockchain supporting a financial security smart contract and facilitating, through the API, the investor computing system to post, on the security blockchain, loan links. Each of the loan links identifies a loan structured as a loan smart contract supported by a loan blockchain. The loan blockchain stores a financial profile link that identifies the dynamic financial profile.

These and other features, together with the organization and manner of operation thereof, will become apparent from the following detailed description when taken in conjunction with the accompanying drawings.

BRIEF DESCRIPTION OF THE FIGURES

FIG. 2A is a diagram of an example of the loan marketplace server of the loan securitization system set forth in FIG. 1A, according to some arrangements.

FIG. 2B is a diagram of an example of the investor computing system of the loan securitization system set forth in FIG. 1A, according to some arrangements.

DETAILED DESCRIPTION

Figure 1A:
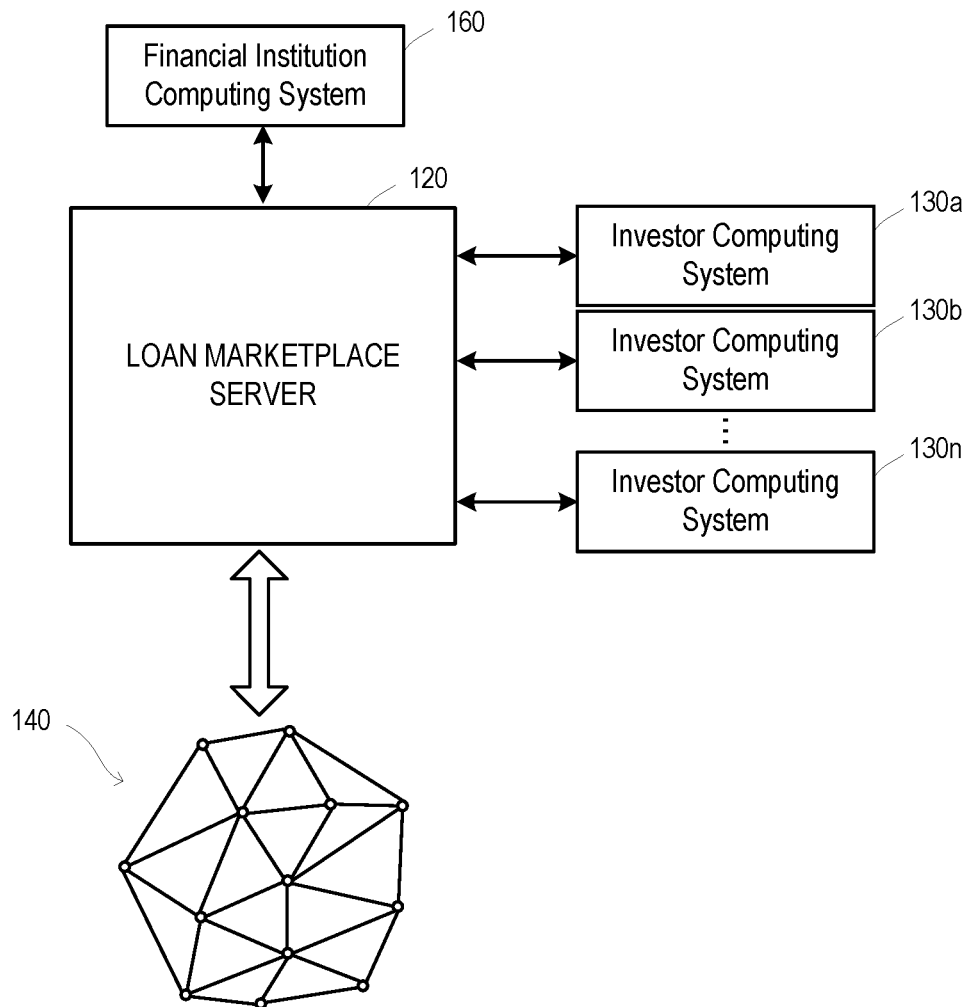
FIG. 1A is a diagram of a loan securitization system for automatic loan securitization, according to some arrangements.

A blockchain is a network-managed, distributed, and decentralized ledger containing information regarding to one or more transactions made across a Peer-to-Peer (P2P) network. The blockchain is replicated and stored on various nodes of the network without any one entity (e.g., a central database) acting as a central authority for the information stored on the blockchain. Each node may include a computing device having at least processing, storage, and networking capabilities. In other words, the blockchain utilizes a distributed ledger rather than a centralized database. Thus, participants of the one or more transactions, as well as other authorized actors, can verify the authenticity of the transactions on the blockchain without referring to a central certifying authority.

Each block on the blockchain stores some information related to the underlying transactions and contains a timestamp and a link to a block previously appended to the blockchain. Once a block is appended to the blockchain, a message containing details about the block is sent to each of the nodes storing copies of the blockchain. Each node updates the locally stored blockchain by appending the block to the blockchain according to the timestamp. Once a block is appended to the blockchain, any node storing and managing the same blockchain cannot unilaterally delete or alter information stored on that block. This is because such actions cause inconsistency among different nodes storing copies of the same blockchain. Such inconsistency can be easily detected during cross-checking. Accordingly, blockchains provide fast (sometimes real-time) and automatic updates of information for relevant parties to the transactions, as well as transparency and traceability.

A blockchain can enable smart contract features. A smart contract includes built-in conditions that, if satisfied, allow a predetermined transaction or action to take place. Examples of such conditions include, but are not limited to, approvals by a party to transactions, approvals by a third party (e.g., a government agency, and/or the like), performing an act or transaction, and the like. Examples of performing an act or transaction include, but are not limited to, paying a predetermined transaction amount, shipping goods, performing a service, and/or the like. Once satisfaction of one or more conditions is detected, the smart contract can allow a transaction to take place. Illustrating with a non-limiting example, once a first block indicating that approval is granted by a government agency is appended to the blockchain, the smart contract configured for the blockchain allows a payment from a first party to a second party to be automatically executed to complete a transaction. A second block containing information about the payment is appended to the blockchain. Responsive to reading the first block or responsive to reading the second block, shipment of goods from the second party to the first party is automatically executed. A third block containing information about the shipping is appended to the blockchain.

Arrangements described herein relate to apparatuses, systems, and methods for a loan securitization system to provide blockchain-based loan securitization. In some arrangements, each loan is structured as a smart contract (referred to herein as a "loan smart contract") implemented on a blockchain (referred to herein as a "loan blockchain"). In some arrangements, each loan smart contract contains a link (such as, but not limited to, a token) to an associated borrower's dynamic financial profile. The dynamic financial profile of the borrower can include user information such as, but not limited to, loan request data, personal identification data, financial activity data, post-origination data, and the like. The user information contained in the dynamic financial profile is being updated even after the loan has been originated and while the loan is being serviced, thus providing insight into the risks associated with the loan during the loan securitization. In some arrangements, the link or token pointing to the dynamic financial profile persists in the loan smart contract throughout the lifecycle of the loan, such that the dynamic financial profile is accessible to the investor even if the investor is not the originator of the loan.

The blockchain-based loan securitization system can provide a platform (e.g., a loan marketplace server) for investors to select and bundle loans. For example, loans or mortgages can be pooled into securities such as, but not limited to, MBSs, CDOs), and/or the like. Each security is structured as a smart contract (referred to herein as a "financial security smart contract") implemented on a blockchain (referred to herein as a "security blockchain"). A financial security smart contract contains a link pointing to each constituent loan smart contract or loan blockchain. Each investor can interrogate each constituent loan blockchain or loan smart contract for the user information stored in the dynamic financial profile to manage risk.

In addition, investors can unbundle a security, repackage unbundled constituent loans, resell the constituent loans, and/or perform other securitization operations using the blockchain-based loan securitization system. For example, a new financial security smart contract and a corresponding new security blockchain aggregates some constituent loans that have previously been bundled as a part of another security. The new financial security smart contract contains a link pointing to each constituent loan smart contract or loan blockchain, including those that have previously been a part of another security. As such, regardless of how a constituent loan is securitized (e.g., packaged and repackaged), the financial security smart contract bundling that constituent loan can access the dynamic financial profile of the associated borrower.

Accordingly, greater transparency and traceability can be provided to an interested investor who can use the user information contained in the dynamic financial profile to analyze risk for an investment. For example, rates and premiums are reflected as a function of the transparency of the user information, given that improved transparency is associated with lesser risk and higher premiums. Upstream securities including a same constituent loan can identify the constituent loan and query the dynamic financial profile for up-to-date information about the associated borrower.

On the other hand, traditional securitization processes do not provide any solutions that can trace constituent loans to obtain current information about the associated risk due to the packaging and repackaging. It is infeasible for human operators to perform the arrangements described herein without facilitation by the blockchain implementation due to the number of loans involved in each security, the amount of information that needs to be gathered for each loan, the staleness of the information, and the like.

Traditional computerized systems require centralized data management that is prone to serious security and transparency issues. A centralized middleman is generally an originator of a constituent loan that is later sold and resold. Securities including the constituent loan may not even contain any identifying information based on which the constituent loan can be traced. Thus, the investor interested in a security including the constituent loan has no access to the information crucial in determining the risk associated with the security.

In some arrangements, each constituent loan described herein can be managed in a manner consistent with U.S. Provisional Application No. 62/491,202 titled Blockchain Based Loan Marketplace and filed Apr. 27, 2017, which is incorporated herein by reference in its entirety. For example, each constituent loan is associated with borrower-defined transparency parameters to enable dynamic rates from origination of a loan to termination of the loan.

In some arrangements, before the loan is approved, the borrower can agree to release additional information (e.g., the post-origination data) during the loan service phase as part of the loan. The post-origination data includes, but not limited to, financial activity data obtained after the origination of the loan, collateral data, and the like. The dynamic financial profile of the user continues to accrue up-to-date post-origination data in addition to the other data already stored therein.

Although the term "loan" is used throughout, one of ordinary skill in the art can recognize that the arrangements described herein are intended to be implemented for any financial instrument (e.g., CDOs or MBSs, such as but not limited to, those secured b contractual debt obligations (e.g., loans, mortgages, notes, bonds, and the like. One of ordinary skill in the art can appreciate that the described arrangements can likewise be implemented for other financial instruments such as, but not limited to, mutual funds, Credit Default Swaps (CDSs), and the like.

Figure 1B:
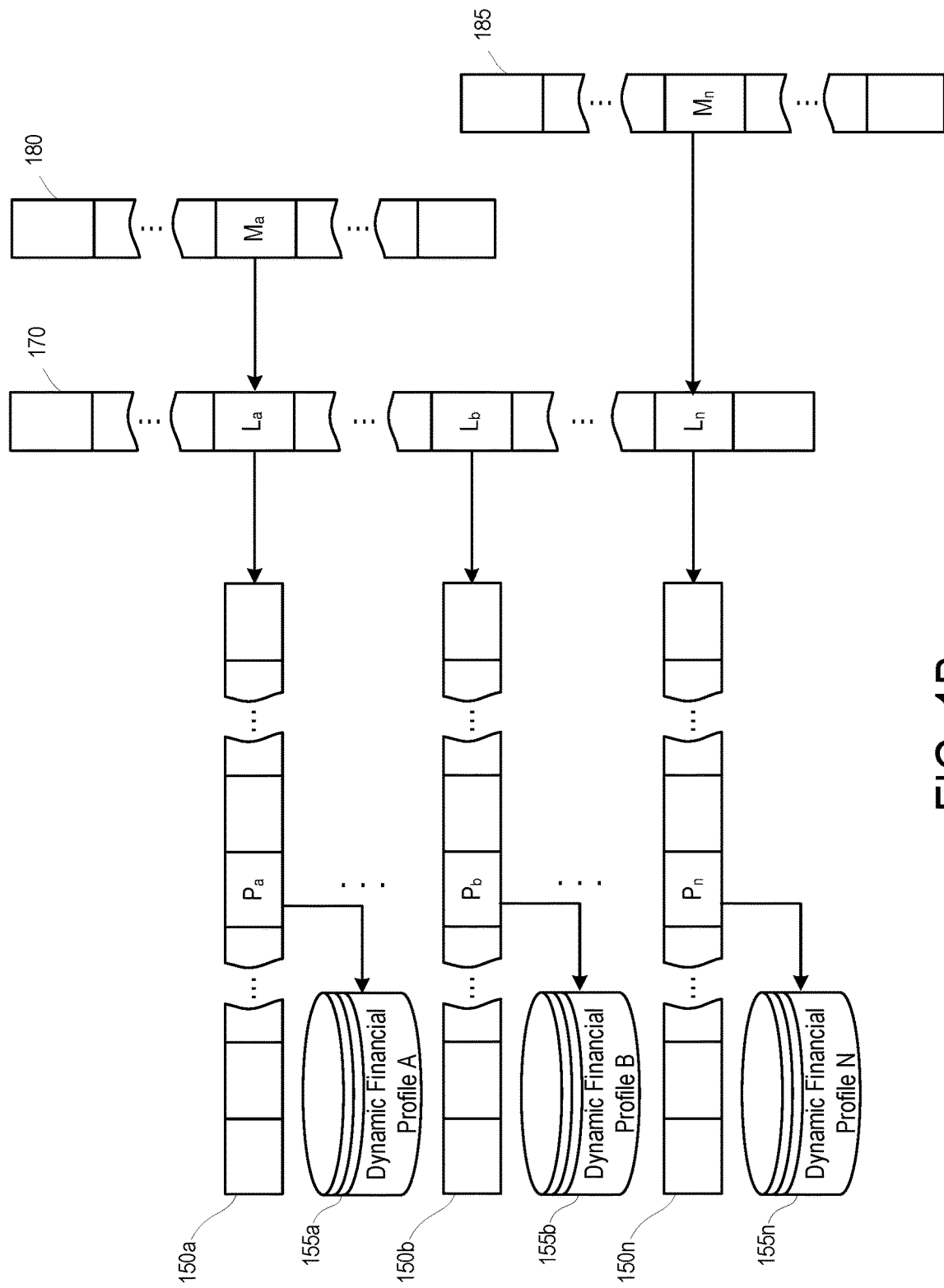
FIG. 1B is a diagram of blockchains used by the loan securitization system of FIG. 1A for automatic loan securitization, according to some arrangements.

FIG. 1A is a diagram of a loan securitization system 100 for automatic loan securitization, according to some arrangements. FIG. 1B is a diagram of blockchains 150a-150n, 170, 180, and 185 used by the loan securitization system 100 of FIG. 1A for automatic loan securitization, according to some arrangements. Referring to FIGS. 1A-1B, the loan securitization system 100 includes a loan marketplace server 120, at least one investor computing system (e.g., investor computing systems 130a-130n), and a financial institution computing system 160. Each of the investor computing systems 130a-130n corresponds to a computing system operated by an investor who securitizes pools of two or more constituent loans. An investor can be a financial institution, a company, an individual, or the like.

The loan securitization system 100 includes a distributed ledger network 140 capable of supporting blockchains (e.g., one or more of the blockchains 150a-150n, 170, 180, and 185). The distributed ledger network 140 is P2P network formed by nodes. Each node of the distributed ledger network 140 represents a computing system that has processing, storage, and networking capabilities. Each node of the distributed ledger network 140 is capable of storing and updating replications of the blockchains in a manner consistent with distributed ledgers. In some arrangements, one or more nodes of the distributed ledger network 140 are capable of reading data stored on the blockchains, subject to proper authentication. In some arrangements, one or more nodes of the distributed ledger network 140 are capable of appending blocks to one or more of the blockchains.

In some arrangements, the loan marketplace server 120 provides an API to each of the investor computing systems 130a-130n to facilitate generating, reading, and/or adding to one or more of the blockchains 150a-150n, 170, 180, and 185. In some arrangements, the loan marketplace server 120 can provide an application platform for one or more of the investor computing systems 130a-130n to become a part of the distributed ledger network 140. In other words, the loan marketplace server 120 can provide the API for one or more of the investor computing systems 130a-130n to become nodes in the distributed ledger network 140. A node in the distributed ledger network 140 can perform one or more of replicating blockchains for local storage, reading existing blocks of blockchains, adding new blocks to blockchains, or other suitable blockchain operations. In some arrangements, the loan marketplace server 120 is a node in the distributed ledger network 140. In such arrangements, the loan marketplace server 120 can generate, read, and/or add to blockchains.

The distributed ledger network 140 is any suitable Local Area Network (LAN), Wide Area Network (WAN), or a combination thereof. For example, the distributed ledger network 140 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS), Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (lx), General Packet Radio Service (GPRS), Personal Communications Service (PCS), 802.11X, ZigBee, Bluetooth, Wi-Fi, any suitable wired network, combination thereof, and/or the like. The network is structured to permit the exchange of data, values, instructions, messages, and the like between nodes of the network.

In some arrangements, the loan marketplace server 120 is a timestamp server that timestamps blocks in one or more of the blockchains 150a-150n, 170, 180, and 185 as the blocks are appended thereto. In other arrangements, a server separate from the loan marketplace server 120 is the timestamp server.

In arrangements in which one of the investor computing systems 130a-130n does not become a part of the distributed ledger network 140 or cannot directly perform any blockchain operations for any reason, the loan marketplace server 120 can perform blockchain operations on behalf of that investor computing system. The investor computing system can send information to be added to one or more of the blockchains 150a-150n, 170, 180, and 185 to the loan marketplace server 120. The loan marketplace server 120 can append blocks containing such information to the one or more of the blockchains 150a-150n, 170, 180, and 185. The investor computing systems 130a-130n can query the loan marketplace server 120 for information stored on one or more of the blockchains 150a-150n, 170, 180, and 185. The loan marketplace server 120 can read blocks containing queried information and send such information to the investor computing system.

Each of the loan blockchains 150a-150n contains information about a loan and/or links to information about the loan. Each loan is structured as a loan smart contract supported on a respective one of the loan blockchains 150a-150n. For instance, each of the loan blockchains 150a-150n includes blocks that contain the information about a respective loan and/or links to the information about a respective loan. In some arrangement, each of the loan blockchains 150a-150n includes at least a block (e.g., one of blocks $P_a$, $P_b$, . . . , $P_n$) that stores a financial profile link or another suitable identifier to a dynamic financial profile of the borrower. For example, the loan blockchain 150a contains a block $P_a$ that stores a financial profile link to dynamic financial profile A 155a of a borrower for the loan supported by the loan blockchain 150a. The loan blockchain 150b contains a block $P_b$ that stores a financial profile link to dynamic financial profile B 155b of a borrower for the loan supported by the loan blockchain 150b. The loan blockchain 150n contains a block $P_n$ that stores a financial profile link to dynamic financial profile N 155n of a borrower for the loan supported by the loan blockchain 150n.

In some arrangements, each of the financial profile links includes a unique identifier based on which a borrower and/or a dynamic financial profile can be identified. Examples of the unique identifier for a financial profile link include, but are not limited to, a Uniform Resource Identifier (URI) (e.g., a Uniform Resource Locator (URL)), a Universally Unique Identifier (UUID), an Internationalized Resource Identifier (IRI), a suitable identification number (e.g., Social Security Number (SSN), Person Identification Number (PIN), bank account number, state identification number, driver license number, or the like), and the like. In some arrangements, private numbers such as, but not limited to, the SSN, the PIN, the bank account number, the state identification number, the driver license number, and the like are not used to protect the identity of the borrower. In some examples, the unique identifier can be a hash of one of the described numbers/identifiers. In some examples, the unique identifier can be a hash of two or more of the described numbers/identifiers. Hashing can be used to mask the actual identity of the borrower while uniquely identifying the dynamic financial profile and/or the borrower. Given that the unique identifier masks the actual identity of the borrower, privacy and security can be provided.

In some arrangements, the loan marketplace server 120 (e.g., the processing circuit 222 of FIG. 2A) can perform the hashing and associate the unique identifier (as a result of the hashing) with the borrower and an associated dynamic financial profile. Prior to determining the hash, the marketplace server 120 (e.g., the processing circuit 222 of FIG. 2A) can perform suitable vetting processes to verify the identity of the borrower. In some arrangements, the loan marketplace server 120 (e.g., the processing circuit 222 of FIG. 2A) can append an approval block containing digital endorsement (e.g., digital notary, digital signature, and/or the like) to a corresponding one of the loan blockchains 150a-150n to authenticate that the unique identifier is associated with a vetted borrower.

In some arrangements, the loan marketplace server 120 can use the unique identifier to update an associated dynamic financial profile given that the unique identifier can also be used by a trusted third party (e.g., the financial institution computing system 160, a credit agency, or the like) and/or the borrower to exchange information about the constituent loans.

An investor operating the investor computing system 130a can pool the loans supported by the loan blockchains 150a-150n into a security, such as, but not limited to, a MBS, a CDO, or the like. The security can be structured as a financial security smart contract supported by the security blockchain 170. The security blockchain 170 includes at least one block (e.g., blocks $L_a, L_b, \ldots,$ LO that stores a loan link to or another suitable identifier of a constituent loan. For example, the security blockchain 170 contains a block $L_a$ that stores a loan link that identifies the loan blockchain 150a and/or the loan smart contract associated therewith. The security blockchain 170 contains a block $L_b$ that stores a loan link that identifies the loan blockchain 150b and/or the loan smart contract associated therewith. The security blockchain 170 contains a block $L_a$ that stores a loan link that identifies the loan blockchain 150n and/or the loan smart contract associated therewith. Therefore, the security blockchain 170 includes identifiers of its constituent loans.

In some arrangements, each of the loan links includes a unique identifier based on which a corresponding one of the loans can be identified. In some examples, the unique identifier for a loan is different from the unique identifier (contained in the financial profile link) for a borrower and/or a dynamic financial profile of the borrower. In other examples, the unique identifier for the loan is the same as the unique identifier for the borrower and/or the dynamic financial profile of the borrower.

Examples of the unique identifier for a loan link include, but are not limited to, a URI (e.g., a URL), a UUID, an IRI, a suitable identification number uniquely identifying the loan, and the like. In some examples, the unique identifier can be a hash of one of the described numbers/identifiers. In some examples, the unique identifier can be a hash of two or more of the described numbers/identifiers. In some arrangements, the loan marketplace server 120 (e.g., the processing circuit 222 of FIG. 2A) can perform the hashing and associate the unique identifier (as a result of the hashing) with the corresponding loan.

In some arrangements, the security associated with the security blockchain 170 can be unpackaged and repacked into one or more other securities for resell. For example, the investor operating the investor computing system 130a or another investor operating another one of the investor computing systems 130b-130n can generate another security (e.g., a MBS, a CDO, or the like) that includes constituent loans previously associated with the security blockchain 170.

In some arrangements, a security blockchain 180 contains a block $M_a$ that stores a secondary link that directly or indirectly identifies the loan blockchain 150a and/or the loan smart contract associated therewith. In one example, the block $M_a$ includes a secondary link or another suitable identifier pointing to the block $L_a$. To obtain the information contained in the block $L_a$, the secondary link stored in the block $M_a$ is retrieved and used to identify the block $L_a$, and a query is sent to interrogate for the information stored in the block $L_a$. Such indirect implementations allow the security blockchain 180 to trace history of the constituent loan associated with loan blockchain 150a (e.g., the constituent loan is purchased from the security corresponding to the security blockchain 170). In another example, the block $M_a$ includes a secondary link or another suitable identifier pointing directly to the loan blockchain 150a. The loan link information contained in the block $L_a$ can be copied to the block $M_a$ upon purchasing the constituent loan corresponding to the loan blockchain 150a.

In some arrangements, the security blockchain 180 can include at least one block that stores an indicator that associates the security blockchain 170 with the block $M_a$ to indicate the relationship therebetween. In some examples, the security blockchain 180 can include at least one block that stores a digital signature, a digital notary, and/or another suitable digital certificate that attests to the validity of moving the loan blockchain 150a from the security blockchain 170 to the security blockchain 180.

In some arrangements, a security blockchain 185 contains a block $M_a$ that stores a secondary link that directly or indirectly identifies the loan blockchain 150n and/or the loan smart contract associated therewith. In one example, the block $M_a$ includes a secondary link or another suitable identifier pointing to the block $L_a$. To obtain the information contained in the block $L_a$, the secondary link stored in the block $M_n$ is retrieved and used to identify the block $L_a$, and a query is sent to interrogate for the information stored on the block $L_a$. Such indirect implementations allow the security blockchain 185 to trace history of the constituent loan associated with loan blockchain 150n (e.g., the constituent loan is purchased from the security corresponding to the security blockchain 170). In another example, the block $M_a$ includes a secondary link or another suitable identifier pointing directly to the loan blockchain 150n. Information contained in the block $L_a$ can be copied to the block $M_n$ upon purchasing the constituent loan corresponding to the loan blockchain 150n.

In some arrangements, the security blockchain 185 can include at least one block that stores an indicator that associates the security blockchain 170 with the block $M_n$ to indicate the relationship therebetween. In some examples, the security blockchain 185 can include at least one block that stores a digital signature, a digital notary, and/or another suitable digital certificate that attests to the validity of moving the loan blockchain 150n from the security blockchain 170 to the security blockchain 185.

Examples of the unique identifier for a secondary link include, but are not limited to, a URI (e.g., a URL), a UUID, an IRI, a suitable identification number uniquely identifying the loan, another security blockchain, a block in another security blockchain, and the like. In some examples, the unique identifier can be a hash of one of the described numbers/identifiers.

The securities associated with the security blockchains 180 and 185 can be further unpackaged and repackaged in the manner described with respect to the security associated with the security blockchain 170. In particular, a direct or indirect link to a constituent loan blockchain is maintained by a security blockchain for traceability and transparency. In some arrangements, the direct and indirect links can persist throughout the lifecycle of the constituent loans.

Thus, regardless of many iterations of unpacking and repackaging, the relationship between the current security instrument and its constituent loans cannot be lost due to the security, traceability, and transparency provided by the blockchain/smart contract implementation. The investors can backtrack to the constituent loans via the loan blockchains 150a-150n to extract information stored in the dynamic financial profiles 155a-155n to determine risk associated with the constituent loans. The usage of the blockchain/smart contract implementation allows a tremendous amount of information to be managed efficiently.

In some arrangements, each of the loan blockchains 150a-150n stores additional information or links/pointers to the additional information stored on another blockchain or database. The additional information includes, but is not limited to, terms and conditions of a loan. The terms and conditions are self-executing via the loan smart contract implementation.

In some arrangements, the dynamic financial profile stores personal identification data of the borrower. The personal identification data includes information that can be used to identify the borrower. Examples of the personal identification data include, but are not limited to, name, age, birthdate, race, gender, sexual orientation, nationality, address, social security number, contact information, employer information, tax information, criminal history, and the like.

In some arrangements, the dynamic financial profile stores financial activity data. The financial activity data includes financial information of the borrower as results of the borrower's financial activities. Examples of the financial activity data include, but not are not limited to, a credit score (e.g., a Fair Isaac Corporation (FICO) score), liabilities, assets, income, and the like.

In some arrangements, the dynamic financial profile stores post-origination data. The post-origination data includes information relative to conditions or contingencies that need to be fulfilled during servicing of the loan and after the loan has been originated. In some arrangements, to keep the agreed-upon terms (e.g., agreed-upon interest rate) of the approved loan, the borrower may be required to fulfill certain conditions during the loan servicing phase. Examples of such conditions or contingencies include, but are not limited to, maintaining a designated level of financial health, controlling designated risks associated with any collaterals of the loan, and the like. Maintaining a designated level of financial health includes having a designated balance in a bank account, refraining from incurring liability exceeding a designated amount, maintaining a credit score above a designated threshold, making payments on time, making payments of the appropriate amount, and the like. Information pertinent to maintaining the designated level of financial health after origination (e.g., payment history, credit score, and/or the like) can be obtained (e.g., received via a suitable network) from a trusted-third party (e.g., the financial institution computing system 160 of a financial institution servicing the borrower, a credit report agency, and the like) and/or from the borrower's self-reporting. Controlling designated risks associated with any collaterals of the loan includes obtaining designated insurance on the collateral (e.g., fire insurance on a house), providing disaster alarm or relief systems for the collateral (e.g., providing functional fire alarms for a house), and the like. Information pertinent to controlling designated risks after origination can be obtained (e.g., received via a suitable network) from a trusted-third party (e.g., an insurance agency, maintenance companies, utilities companies, and the like), from disaster alarm or relief systems configured as Internet-of-Things (IoT) devices directly via a suitable network, and/or from the borrower's self-reporting.

The dynamic financial profiles 155a-155n are managed by the loan marketplace server 120. In some arrangements, some or all of the post-origination data is retrieved via the dynamic financial profiles 155a-155n. In some arrangements, the loan marketplace server 120 receives various types of the information described herein from borrower's computing devices, financial institutions (e.g., the financial institution computing system 160) servicing the borrowers, trusted third-parties, IoT devices, and/or the like. While one financial institution computing system 160 is shown, one of ordinary skill in the art can appreciate the one or more financial institution computing systems servicing the borrowers can be present. The dynamic financial profiles 155a-155n are being updated constantly as more information about borrowers is accrued. In other words, as information is being received, the loan marketplace server 120 updates the dynamic financial profiles 155a-155n to guarantee that the information is up-to-date. In some arrangements, the loan marketplace server 120 can store the dynamic financial profiles 155a-155n in one or more databases.

In some arrangements, the loan marketplace server 120 can manage and/or read the dynamic financial profiles 155a-155n of the borrowers on user profile blockchains. In this regard, borrower's devices, the financial institutions (e.g., the financial institution computing system 160) servicing the borrowers, trusted third-parties, IoT devices, and/or the like can append blocks to the user profile blockchains constantly, thus assuring that the user profile blockchains are up-to-date.

In some arrangements, the dynamic financial profile is verified by the loan marketplace server 120 for authenticity. As such, even if a borrower chooses to not reveal any personal identification data with respect to any loan requests to any potential lenders, the loan marketplace server 120 can still be sure that the user behind the loan request is a real person.

FIG. 2A is a diagram of an example of the loan marketplace server 120 of the loan securitization system 100 set forth in FIG. 1A, according to some arrangements. Referring to FIGS. 1-2A, the loan marketplace server 120 is shown to include various circuits and logic for implementing the operations described herein. More particularly, the loan marketplace server 120 includes at least a processing circuit 222, a network interface 226, a blockchain circuit 227, and a dynamic financial profile database 228. While various circuits, interfaces, and logic with particular functionality are shown, it should be understood that the loan marketplace server 120 includes any number of circuits, interfaces, and logic for facilitating the operations described herein. For example, the activities of multiple circuits are combined as a single circuit and implemented on a same processing circuit (e.g., the processing circuit 222), as additional circuits with additional functionality are included.

In some arrangements, the processing circuit 222 has a processor 223 and memory 224. The processor 223 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 224 (e.g., Random Access Memory (RAM), Read-Only Memory (ROM), Non-volatile RAM (NVRAM), Flash Memory, hard disk storage, etc.) stores data and/or computer code for facilitating the various processes described herein. Moreover, the memory 224 is or includes tangible, non-transient volatile memory or non-volatile memory. Accordingly, the memory 224 includes database components, object code components, script components, or any other type of information structure for supporting the various activities and information structures described herein. In some arrangements, the memory 224 stores local copies of one or more of the blockchains 150a-150n, 170, 180, and 185.

The network interface 226 is configured to establish connection with the investor computing systems 130a-130n, the financial institution computing system 160, the nodes of the distributed ledger network 140, at least one server that provides user information, and the like. The network interface 226 is structured for sending and receiving data over a communication network (e.g., the P2P network). Accordingly, the network interface 226 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The blockchain circuit 227 can be implemented with the processing circuit 222 or a separate processing circuit such as, but not limited to, the processing circuit 222. In some arrangements, the blockchain circuit 227 provides blockchain functionalities to one or more of the investor computing systems 130*a*-130*n*. Illustrating with a non-limiting example, the blockchain circuit 227 provides a server-based application to be downloaded by the investor computing systems 130*a*-130*n*. Illustrating with another non-limiting example, the blockchain circuit 227 provides a web-based application to be accessed by the investor computing systems 130*a*-130*n*. The blockchain circuit 227 can provide APIs and/or Software Development Kits (SDKs) to the investor computing systems 130*a*-130*n*.

The blockchain circuit 227 is operatively coupled to one or more of the components of the loan marketplace server 120. For example, the blockchain circuit 227 is operatively coupled to the network interface 226 for communicating with the investor computing systems 130*a*-130*n* and/or various nodes of the distributed ledger network 140. The blockchain circuit 227, as facilitated by the network interface 226, can send information regarding a new block that the investor computing systems 130*a*-130*n* and/or the loan marketplace server 120 is adding to a blockchain to nodes of the distributed ledger network 140. The blockchain circuit 227, as facilitated by the network interface 226, can receive one or more new blocks appended to one or more of the blockchains from nodes of the distributed ledger network 140 and update a local copy of those blockchains accordingly. In some examples, the blockchain circuit 227 manages the blockchains 150*a*-150*n*, 170, 180, and 185. For example, the blockchain circuit 227 can timestamp blocks appended to the blockchains 150*a*-150*n*, 170, 180, and 185.

The dynamic financial profile database 228 stores the dynamic financial profiles 155*a*-155*n* of the borrowers. In some arrangements, the dynamic financial profile database 228 receives various types of the information described herein from the borrowers' computing devices, financial institutions servicing the borrowers (e.g., the financial institution computing system 160), trusted third-parties, IoT devices, and/or the like. The dynamic financial profiles 155*a*-155*n* are updated in real-time as more information about the borrowers is accrued. In other words, as information is being received, the dynamic financial profile database 228 is updated to guarantee that information is up-to-date.

Alternatively or additionally, the loan marketplace server 120 can manage and/or read the dynamic financial profiles 155*a*-155*n* on user profile blockchains. In this regard, the borrowers' computing devices, the financial institutions servicing the borrowers (e.g., the financial institution computing system 160), trusted third-parties, IoT devices, and/or the like can append blocks to the user profile blockchains constantly, thus assuring that the user profile blockchain is up-to-date.

In some arrangements, the dynamic financial profiles 155*a*-155*n* stored in the dynamic financial profile database 228 and in the user profile blockchains are verified by the blockchain circuit 227 for authenticity in any suitable manner.

FIG. 2B is a diagram of an example of the investor computing system 130*a* of the loan securitization system 100 set forth in FIG. 1A, according to some arrangements. Referring to FIGS. 1-2B, while the investor computing system 130*a* is shown and discussed herein, other investor computing systems 130*b*-130*n* can be similarly implemented and used. An investor operates or is associated with the investor computing system 130*a*. The investor computing system 130*a* is used to manage the security blockchain 170.

The investor computing system 130*a* is shown to include various circuits and logic for implementing the operations described herein. More particularly, the investor computing system 130*a* includes at least a processing circuit 242, a network interface 246, a blockchain security application 247, and an input/output circuit 245. While various circuits, interfaces, and logic with particular functionality are shown, it should be understood that the investor computing system 130*a* includes any number of circuits, interfaces, and logic for facilitating the operations described herein. For example, the activities of multiple circuits are combined as a single circuit and implemented on a same processing circuit (e.g., the processing circuit 242), as additional circuits with additional functionality are included.

In some arrangements, the processing circuit 242 has a processor 243 and memory 244. The processor 243 is implemented as a general-purpose processor, an ASIC, one or more FPGAs, a DSP, a group of processing components, or other suitable electronic processing components. The memory 244 (e.g., RAM, ROM, NVRAM, Flash Memory, hard disk storage, etc.) stores data and/or computer code for facilitating the various processes described herein. Moreover, the memory 244 is or includes tangible, non-transient volatile memory or non-volatile memory. Accordingly, the memory 244 includes database components, object code components, script components, or any other type of information structure for supporting the various activities and information structures described herein. In some arrangements, the memory 244 stores a local copy of the blockchain 170.

The network interface 246 is configured for and structured to establish connection with the loan marketplace server 120 and the nodes of the distributed ledger network 140. The network interface 246 is structured for sending and receiving of data over a communication network (e.g., the P2P network). Accordingly, the network interface 246 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The input/output circuit 245 is configured to receive user input from and provide information to a designated operator of the investor computing system 130*a*. In this regard, the input/output circuit 245 is structured to exchange data, communications, instructions, etc. with an input/output component of the investor computing system 130*a*. Accordingly, in some arrangements, the input/output circuit 245 includes an input/output device, such as a display device, touchscreen, keyboard, microphone, and/or the like. In some arrangements, the input/output circuit 245 includes communication circuitry for facilitating the exchange of data, values, messages, and the like between the input/output device and the components of the investor computing system 130a. In some arrangements, the input/output circuit 245 includes machine-readable media for facilitating the exchange of information between the input/output device and the components of the investor computing system 130a. In still another arrangement, the input/output circuit 245 includes any combination of hardware components (e.g., a touchscreen), communication circuitry, and machine-readable media.

The blockchain security application 247 is executed by the processing circuit 242 in some arrangements. The loan marketplace server 120 can provide the blockchain security application 247 in various manners. In some arrangements, the blockchain security application 247 is a server-based application executable on the investor computing system 130a. In this regard, the operator of the investor computing system 130a has to download the blockchain security application 247 from the loan marketplace server 120 or another application download server prior to usage. In some arrangements, the blockchain security application 247 is a web-based interface application provided by the loan marketplace server 120. In this configuration, the operator has to log onto or otherwise access the web-based interface before usage. In this regard, the loan marketplace server 120 transmits the blockchain security application 247 to the investor computing system 130a. In some arrangements, the blockchain security application 247 includes an API and/or an SDK provided by the loan marketplace server 120 that facilitates integration with other applications. As described, the loan marketplace server 120 can provide the API for the investor computing system 130a to handle blockchain operations. In other arrangements, the blockchain security application 247 is coded into the memory 204 of the investor computing system 130a. All such variations and combinations are intended to fall within the spirit and scope of the present disclosure.

The blockchain security application 247 is operatively coupled to one or more of the components of the investor computing system 130a. For example, the blockchain security application 247 is operatively coupled to the network interface 246 for communicating with the loan marketplace server 120 and/or various nodes of the distributed ledger network 140. The blockchain security application 247, as facilitated by the network interface 246, can send information regarding a new block that the investor computing system 130a is adding to a blockchain (e.g., the blockchain 170) to nodes of the distributed ledger network 140. The blockchain security application 247, as facilitated by the network interface 246, can receive one or more new blocks appended to the blockchain 170 from nodes of the distributed ledger network 140 and update a local copy of the blockchain 170 accordingly. In some examples, the blockchain security application 247 is coupled to the input/output circuit 245 to display output and receive user input.

Figure 3:
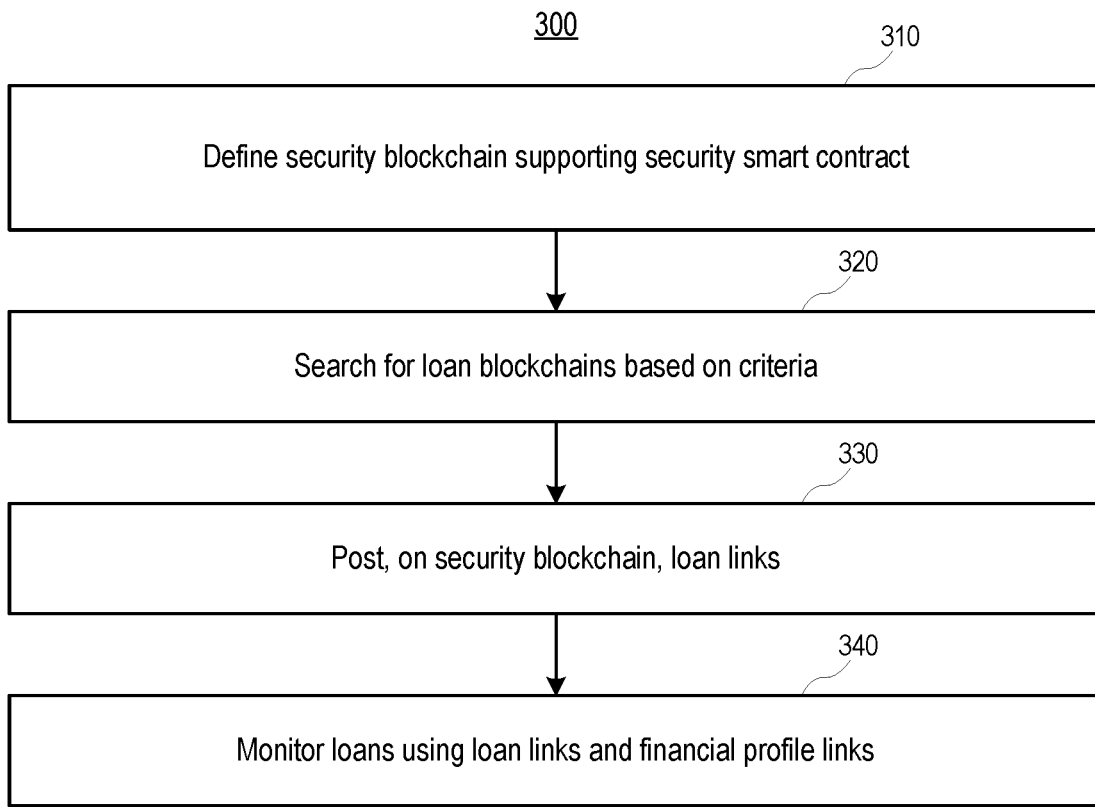
FIG. 3 is a flow diagram illustrating a method for automating loan securitization, according to various arrangements.

FIG. 3 is a flow diagram illustrating a method 300 for automating loan securitization, according to various arrangements. Referring to FIGS. 1-3, the method 300 is performed by the loan marketplace server 120. The method 300 is concerned with using a security blockchain (e.g., the security blockchain 170) to manage constituent loans structured as loan smart contracts supported by loan blockchains (e.g., the loan blockchains 150a-150n).

At 310, the loan marketplace server 120 defines a security blockchain supporting a financial security smart contract in some arrangements. In some situations, the investor operating the investor computing system 130a desires to create a security (e.g., a CDO, a MBS, or the like) to buy from the loan marketplace server 120 by aggregating loans managed by the loan marketplace server 120. In some examples, the loan marketplace server 120 receives a generation message from the investor computing system 130a to generate a security blockchain and an associated financial security smart contract. In some arrangements, the generation message is digitally signed (e.g., with a digital notary, digital signature, and/or the like) by the investor computing system 130. In some arrangements, the generation message is sent using Transport Layer Security (TLS).

The loan marketplace server 120 generates the security blockchain 170 and a financial security smart contract associated therewith. In some examples, the loan marketplace server 120 defines the security blockchain 170 by providing the API (e.g., the blockchain security application 247) to the investor computing system 130a such that the investor computing system 130a can generate the security blockchain 170. A notification can be sent to nodes of the distributed ledger network 140. Each node can replicate the security blockchain 170.

In other situations, the loan marketplace server 120 may want to create a security (e.g., a CDO, a MBS, or the like) to sell by aggregating one or more loans managed by the loan marketplace server 120. In some examples, the loan marketplace server 120 generates the security blockchain 170 without any input from the investor computing system 130a.

At 320, the loan marketplace server 120 searches for the loan blockchains 150a-150n based on certain criteria in some examples. In some examples, the investor computing system 130a receives user input corresponding to the criteria from the investor. In some examples, the investor computing system 130a sends the criteria to the loan marketplace server 120. In some examples, the in loan marketplace server 120 (e.g., the processing circuit 222) defines the search criteria without any input from the investor computing system 130a.

Examples of the criteria include, but are not limited to, a type of loan, a loan amount, a loan term, availability/transparency of certain types of information allowed by the borrower (e.g., as limited by a transparency parameter, a geographical location associated with the loan (e.g., a city or a state in which a mortgage is issued), a risk threshold factor, and the like). The loan marketplace server 120 searches the information stored on available loan blockchains (including the loan blockchains 150a-150n) and the information pointed to by links on the loan blockchains (e.g., the information stored in the dynamic financial profile database 228). The loan marketplace server 120 returns a list of loans (e.g., the loans supported by the loan blockchains 150a-150n) that meet the criteria. Each of the loan blockchains 150a-150n is identified by a unique identifier in the manner described.

In some examples, the loan marketplace server 120 sends tokens, digital signatures, and/or public/private keys to the investor computing system 130a. Authorized by the tokens, digital signatures, and/or public/private keys, the investor computing system 130a can search the loans managed by the loan marketplace server 120 based on the criteria. Alternatively, biometric electronic signature tokens can be used for authentication in the manner described. The tokens, digital signatures, public/private keys, and/or biometric electronic signature tokens can limit authorization to only the information commensurate with transparency parameters defined by the borrowers in some examples. In other examples, the tokens, digital signatures, public/private keys, and/or biometric electronic signature tokens allow the investor computing system 130a to search additional information beyond the scope of the transparency parameters. In some examples, the tokens, digital signatures, public/private keys, and/or biometric electronic signature token are associated with a time to live (TTL) and expire after a predetermined period of time or after certain tasks (e.g., the search) has been completed. As such, the tokens, digital signatures, public/private keys, biometric electronic signature token can be associated with temporary access. The investor computing system 130a returns a list of loans (e.g., the loans supported by the loan blockchains 150a-150n) that meet the criteria. Each of the loan blockchains 150a-150n is identified by a unique identifier in the manner described.

At 330, the loan marketplace server 120 posts, on the security blockchain 170, loan links. Each of the loan links identifies a loan that is structured as a loan smart contract supported by a loan blockchain (e.g., one of the loan blockchains 150a-150n). Posting the loan links on the security blockchain 170 includes, in some arrangements, appending at least one block (e.g., the blocks $L_a$, $L_b$, . . . , and $L_n$) or transaction containing each loan link to the security blockchain 170.

In some examples, the investor operating the investor computing system 130a designates the loans by sending the unique identifiers corresponding to the loan blockchains 150a-150n to the loan marketplace server 120. The loan marketplace server 120 posts the loan links (e.g., the unique identifiers) on the security blockchain 170. In other examples, the loan marketplace server 120 posts the loan links (e.g., the unique identifiers) on the security blockchain 170 by providing the API (e.g., the blockchain security application 247) to the investor computing system 130a such that the investor computing system 130a can posts the loan links (e.g., the unique identifiers) on the security blockchain 170.

As described, examples of the unique identifier for a loan link include, but are not limited to, a URI (e.g., a URL) associated with the loan blockchain, a UUID associated with the loan blockchain, an IRI associated with the loan blockchain, a suitable identification number uniquely identifying the associated with the loan blockchain, a hash of one or more thereof, and the like. As described, on each of the loan blockchains 150a-150n, a corresponding financial profile link to a borrower's dynamic financial profile (e.g., one of dynamic financial profiles 155a-155n) can be stored (e.g., in the blocks $P_a$, $P_b$, . . . , and $P_a$). Examples of the unique identifier for a financial profile link include, but are not limited to, a URI associated with the dynamic financial profile, a UUID associated with the dynamic financial profile, an IRI associated with the dynamic financial profile, a suitable identification number associated with the dynamic financial profile, a hash of one or more thereof, and the like.

At 340, the loans can be monitored using the loan links and the financial profile links. In some examples, the loan marketplace server 120 monitors the loans on behalf of the investor computing system 130a and notifications regarding aspects of the constituent loans (e.g., risk factors, possible default, and the like) to the investor computing system 130a. In other examples, the loan marketplace server 120 monitors the constituent loans providing the API (e.g., the blockchain security application 247) to the investor computing system 130a such that the investor computing system 130a can monitor the constituent loans.

For each constituent loan supported by the security blockchain 170, a corresponding loan link is stored. Using the unique identifiers contained in the loan link (e.g., in block $L_a$), the loan blockchain 150a and/or the loan smart contract associated with the unique identifier can be identified. Using the unique identifiers contained in the financial profile link stored by the loan blockchain 150a, a corresponding dynamic financial profile 155a can be identified.

In some examples, tokens, digital signatures, public/private keys, and/or biometric electronic signature token are provided by the loan marketplace server 120 to allow access to the dynamic financial profiles (e.g., the dynamic financial profile 155a) and information stored on the loan blockchain 150a. For example, loan marketplace server 120 can provide the investor computing system 130a with tokens, digital signatures, and/or public/private keys associated with one or more of the loan links and financial profile links. In some examples, the tokens, digital signatures, public/private keys, biometric electronic signature tokens can limit authorization to only the information commensurate with transparency parameters defined by the borrowers in some examples. In other examples, the tokens, digital signatures, and/or public/private keys allow the investor computing system 130a to access additional information beyond the scope of the transparency parameters. The tokens, digital signatures, and/or public/private keys can persist throughout the lifecycle of the loan to allow access of information about the loan to determine risk.

In alternative arrangements, the loan marketplace server 120 to allow the investor computing system 130a access to the dynamic financial profiles (e.g., the dynamic financial profile 155a) and information stored on the loan blockchain 150a using biometric electronic signature tokens. Examples of the biometric electronic signatures include, but are not limited to, a biometric electronic signature token (described in U.S. application Ser. No. 15/299,308, filed on Oct. 20, 2016, which is incorporated herein by reference in its entirety), a signcrypted biometric electronic signature token (described in U.S. application Ser. No. 15/345,111, filed on Nov. 7, 2016, which is incorporated herein by reference in its entirety), and a biometric electronic signature authenticated key exchange token (described in U.S. Provisional Application No. 62/439,587, filed on Dec. 28, 2016, which is incorporated herein by reference in its entirety). For instance, the investor computing system 130a sends a biometric electronic signature token to the loan marketplace server 120 for authentication. Upon verification by the loan marketplace server 120, the investor computing system 130a is granted access to the loan blockchain 150a and/or one or more of the dynamic financial profiles 155a-155n commensurate with transparency parameters corresponding with the biometric electronic signature token. In some arrangements, upon verification, the investor computing system 130a is authorized to send information (e.g., update materials) to the loan marketplace server 120 (the dynamic financial profiles 155a-155n) and/or appending blocks containing information to any blockchain (e.g., the loan blockchain 150a) described herein.

In some examples, the loan marketplace server 120 and/or the investor computing system 130a enabled by the API provided by the loan marketplace server 120 can interrogate the dynamic financial profile 155a for information about the borrower and the health of the loan after identifying the dynamic financial profile 155a using the loan link and the financial profile link. For example, payment history and financial activity data of the user can be retrieved by the loan marketplace server 120 and/or the investor computing system 130a to determine financial risk associated with the loan.

In a similar manner, upstream investors (e.g., the investor computing systems 130b and 130n) can define security blockchains (e.g., the security blockchains 180 and 185, respectively), search of loan blockchains (e.g., the loan blockchains 150a and 150n), post the loan links on the security blockchains, and monitor the loans using the loan links and financial profile links in the manner described. For example, another security blockchain (e.g., the security blockchain 180) can be defined by the loan marketplace server 120 or the investor computing system 130b. The loan marketplace server 120 or the investor computing system 130b can post on the security blockchain 180 a secondary link (stored in block $M_a$) pointing to a corresponding loan link (stored in block $L_a$) on the security blockchain 170. The loan marketplace server 120 or the investor computing system 130b can identify the corresponding loan link (stored in block $L_a$) using the secondary link (stored in block $M_a$). The blockchain 150a can be identified using the loan link (stored in block $L_a$). The dynamic financial profile 155a can be identified using the financial profile link stored on the loan blockchain 150a at block $P_a$. Authorized to access the dynamic financial profile 155a and the loan blockchain 150a by the tokens, digital signatures, public/private keys, biometric electronic signature tokens, the loan marketplace server 120 and/or the investor computing systems 130b can interrogate for the information stored on the dynamic financial profile 155a and the loan blockchain 150a to assess security risk corresponding to the security blockchain 180.

In addition to interrogation, the loan marketplace server 120 can allow the investor computing systems 130a-130n can append blocks to one or more of the blockchains 150a-150n, 170, 180, and 185 to indicate attestation and/or repudiation of information. As discussed, the data stored on the blockchains 150a-150n, 170, 180, and 185 is tokenized and/or encrypted, and each of the investor computing systems 130a-130n can gain read access to that data using the tokens, digital signatures, public/private keys, biometric electronic signature tokens commensurate with transparency parameters. In a non-limiting example in which the investor computing system 130a is authorized by the loan marketplace server 120 to access a portion of information stored on the loan blockchain 150a, the investor computing system 130a can be further authorized by the loan marketplace server 120 to append blocks to the loan blockchain 150a. Such blocks can indicate attestation or repudiation of some or all of the portion of the information that the investor computing system 130a is authorized to access. In other arrangements, tokens, digital signatures, public/private keys, biometric electronic signature tokens other than those used to gain read access to the loan blockchain 150a are needed to append the attestation or repudiation blocks.

To ensure interoperability, global open standard ontology such as, but not limited to, Financial Industry Business Ontology (FIBO) is used for processes described herein such that different devices (e.g., the loan marketplace server 120, financial institution computing system 160, the investor computing systems 130a-130n, the nodes on the network 140, and/or the like) can use the same standard for exchanging or expressing information.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, ASICs, FPGAs, digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit," as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes, and omissions may be made in the design, operating conditions, and arrangement of the arrangements without departing from the scope of the present disclosure as expressed in the appended claims.

What is claimed is:

1. A method for real-time loan securitization by a loan marketplace server, comprising:
    generating a loan blockchain including an executable loan smart contract;
    generating a security blockchain including a self-executing financial security smart contract;
    posting, on the security blockchain, a loan link identifier object to a loan block by appending, to the security blockchain, the loan block associated with the loan link identifier object, the loan block storing a financial profile link identifier object to a real-time dynamic financial profile for a borrower of the loan block;
    monitoring the loan blockchain in real-time using a corresponding one of the loan link identifier object and the financial profile link identifier object, by interrogating the real-time dynamic financial profile for information about the loan blockchain using a corresponding one of the loan link identifier object and the financial profile link identifier object defining another security blockchain;
    posting, on the another security blockchain, a secondary link identifier object pointing to the loan link identifier object on the security blockchain;
    updating the real-time dynamic financial profile in substantially real-time during servicing of the loan;
    providing one or more of a token, digital signature, public key, or private key to an investor computing system, the token, digital signature, public key, or private key corresponding with one or more predetermined transparency parameters; and
    authorizing the investor computing system to obtain information stored on the loan blockchain and the dynamic financial profile in accordance with the transparency parameters.

2. The method of claim 1, wherein defining the security blockchain comprises:
    receiving a generation message from an investor computing system; and
    generating the security blockchain for the investor computing system based on the generation message.

3. The method of claim 2, wherein the generation message is digitally signed.

4. The method of claim 1, wherein the loan link identifier object comprises one or more of a Uniform Resource Identifier (URI) associated with the loan blockchain, a Universally Unique Identifier (UUID) associated with the loan blockchain, an Internationalized Resource Identifier (IRI) associated with the loan blockchain, or a hash of one or more of the URI, UUID, or IRI.

5. The method of claim 1, wherein the financial profile link identifier object comprises one or more of a Uniform Resource Identifier (URI) associated with the real-time dynamic financial profile, a Universally Unique Identifier (UUID) associated with the real-time dynamic financial profile, an Internationalized Resource Identifier (IRI) associated with the real-time dynamic financial profile, or a hash of one or more of the URI, UUID, or IRI.

6. The method of claim 1, further comprising generating the real-time dynamic financial profile for a borrower of the loan.

7. The method of claim 1, further comprising searching of the loan blockchain based on criteria, wherein the criteria comprise one or more of a type of loan, a loan amount, a loan term, availability or transparency of certain types of information allowed by the borrower, and a risk threshold factor.

8. The method of claim 1, further comprising allowing access to information stored on the loan blockchain and the real-time dynamic financial profile by authenticating a biometric electronic signature token received from an investor computing system.

9. The method of claim 1, further comprising:
identifying the loan link identifier object using the secondary link;
identifying the loan blockchain using the loan link identifier object; and
identifying the real-time dynamic financial profile using the financial profile link identifier object.

10. The method of claim 1, further comprising interrogating the real-time dynamic financial profile to assess risk associated with a security defined by the another security blockchain.

11. The method of claim 1, further comprising authorizing an investor computing system to append at least one block to the loan blockchain to indicate attestation or repudiation of at least some information stored on the loan blockchain.

12. A loan marketplace server, comprising:
a network interface;
a dynamic financial profile database storing a real-time dynamic financial profile of a borrower; and
a processing circuit configured to:
generate a loan blockchain including an executable loan smart contract;
generate a security blockchain including a self-executing financial security smart contract;
post, on the security blockchain, a loan link identifier object to a loan block by appending, to the security blockchain, the loan block associated with the loan link identifier object, the loan block storing a financial profile link identifier object to the real-time dynamic financial profile;
monitor the loan blockchain in real-time using a corresponding one of the loan link identifier object and the financial profile link identifier object, by interrogating the real-time dynamic financial profile for information about the loan blockchain using a corresponding one of the loan link identifier object and the financial profile link identifier object;
define another security blockchain;
post, on the another security blockchain, a secondary link identifier object pointing to the loan link identifier object on the security blockchain;
update the real-time dynamic financial profile in substantially real-time during servicing of the loan;
provide one or more of a token, digital signature, public key, or private key to an investor computing system, the token, digital signature, public key, or private key corresponding with one or more predetermined transparency parameters; and
authorize the investor computing system to obtain information stored on the loan blockchain and the dynamic financial profile in accordance with the transparency parameters.

13. A method for real-time loan securitization by a loan marketplace server providing an Application Programming Interface (API) to an investor computing system, comprising:
facilitating, through the API, the investor computing system to generate a loan blockchain including a self-executing loan smart contract;
facilitating, through the API, the investor computing system to append, to the loan blockchain, a loan block storing a financial profile link identifier object to a real-time dynamic financial profile;
facilitating, through the API, the investor computing system to generate a security blockchain including an executable financial security smart contract;
facilitating, through the API, the investor computing system to post, on the security blockchain, a security block including a loan link identifier object to the loan block;
facilitating, through the API, the investor computing system to monitor the loan blockchain in real-time using a corresponding one of the loan link identifier object and the financial profile link identifier object, by interrogating the real-time dynamic financial profile for information about the loan blockchain using a corresponding one of the loan link identifier object and the financial profile link identifier object;
facilitating, through the API, the investor computing system to define another security blockchain;
facilitating, through the API, the investor computing system to post, on the another security blockchain, a secondary link identifier object pointing to the loan link identifier object on the security blockchain;
facilitating, through the API, the investor computing system to apply an access restriction to the loan blockchain by at least one of tokenizing and encrypting the financial profile link identifier object;
facilitating, through the API, the investor computing system to apply an access restriction to the security blockchain by at least one of tokenizing and encrypting the loan link identifier object;
providing, through the API to the investor computing system, an access object associated with at least one of the access restriction to the loan blockchain and the access restriction to the security blockchain;
updating the real-time dynamic financial profile in substantially real-time during servicing of the loan; and
authorizing the investor computing system to obtain information stored on the loan blockchain and the dynamic financial profile in accordance with the access restriction.

14. The method of claim 13, wherein the loan link identifier object comprises one or more of a Uniform Resource Identifier (URI) associated with the loan blockchain, a Universally Unique Identifier (UUID) associated with the loan blockchain, an Internationalized Resource Identifier (IRI) associated with the loan blockchain, or a hash of one or more of the URI, UUID, or IRI.

15. The method of claim 13, wherein the financial profile link identifier object comprises one or more of a Uniform Resource Identifier (URI) associated with the dynamic financial profile, a Universally Unique Identifier (UUID) associated with the dynamic financial profile, an Internationalized Resource Identifier (IRI) associated with the dynamic financial profile, or a hash of one or more of the URI, UUID, or IRI.

16. The method of claim 1, wherein monitoring the loan blockchain further comprises:
determining, based on the loan links, link identifier object, the loan blockchain; and determining, based on the financial profile link identifier object, the dynamic financial profile.

* * * * *